2,989,538
PROCESS FOR PREPARING PYRAZOLO-
INDENONE HYDRAZONES
Minerva C. Flores, Philadelphia, and Bernard Loev, Broomall, Pa., assignors to Smith Kline & French Laboratories, Philadelphia, Pa., a corporation of Pennsylvania
No Drawing. Filed Feb. 10, 1960, Ser. No. 7,768
2 Claims. (Cl. 260—310)

This invention relates to an advantageous process for preparing 3-tertiary alkyl-pyrazolindenone, hydrazones having pharmacodynamic activity.

More specifically, the process of this invention is advantageous in the preparation of 3-tertiary alkyl-pyrazolo[3,4-a]inden-4(1H)-one, hydrazones having utility in the animal organism as central nervous system depressants, anti-Parkinson agents, hypotensive agents and particularly as tranquilizers and ataractics.

The method in accordance with this invention comprises the reaction of a 3-tertiary alkyl-pyrazoloindenone with hydrazine in the presence of an acid according to the following procedure:

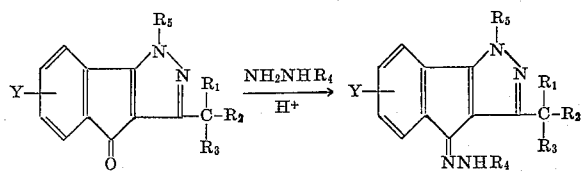

when:

Y represents hydrogen, chloro, trifluoromethyl, methoxy, nitro, methyl, amino, mono-lower alkylamino, di-lower alkylamino or acetamido;
$R_1$, $R_2$ and $R_3$ represent methyl or ethyl; and
$R_4$ and $R_5$ represent hydrogen, acyl such as lower alkanoyl, or lower alkyl.

The preferred compounds prepared by the process of this invention have the following structural formula:

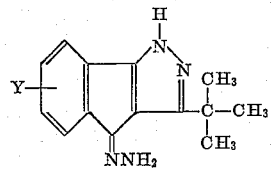

when Y represents hydrogen, chloro or trifluoromethyl.

The term "lower alkyl" where used herein alone or in combination with other terms indicates methyl or ethyl groups; "lower alkanoyl" indicates acetyl or propionyl groups, preferably acetyl; and "alkali metal" indicates a monovalent element of the first group of the periodic system, particularly sodium or potassium.

Previously described methods of preparing 3-substituted-pyrazolo[3,4-a]inden-4(1H)-one, hydrazones by reacting a 3 - substituted-pyrazolo[3,4-a]inden-4(1H)-one with one molar equivalent of hydrazine in ethanol solution or by reacting a 1,3-indandione with two molar equivalents of hydrazine in ethanol solution [Braun and Mosher, J. Am. Chem. Soc., 80:4919–4921 (1958)] provide very low yields of the product when the desired pyrazolo[3,4-a]inden-4(1H)-one, hydrazone has a tertiary alkyl substituent in the 3-position. The novel method of this invention in which the reaction is carried out in the presence of acid unexpectedly provides excellent yields of this product. For example, the yield of 3-t-butylpyrazolo[3,4-a]inden-4(1H)-one, hydrazone by the process of this invention is increased about 40 times over the yield obtained by the previously described methods.

Furthermore the process of this invention is novel and unexpected in view of the reaction which occurs when a pyrazolo[3,4-a]inden-4(1H)-one having a primary or secondary alkyl substituent in the 3-position is similarly reacted with hydrazine in the presence of acid. Under these conditions a 3-primary(or secondary)alkyl-pyrazolo[3,4-a]inden-4(1H)-one, azine (not the hydrazone) is the product. It is indeed surprising that by the process of this invention the pharmacologically active 3-teriary alkyl-pyrazolo[3,4-a]inden-4(1H)-one, hydrazones are prepared.

According to the process of this invention a 3-tertiary alkyl-pyrazoloindenone is reacted with about one molar equivalent of a hydrazine having the formula $$NH_2NHR_4$$

in which $R_4$ is as previously defined, in the presence of acid. Advantageously an excess of the hydrazine is used. The reaction mixtures contains about 1 to 5% by weight of an acid such as a mineral acid, for example hydrochloric or sulfuric acid, or an organic acid having a maximum pKa value of about 4.8, for example, citric, maleic, fumaric, lactic, tartaric or preferably, acetic acid. Alternatively, an acid buffer solution, e.g., a mixture of an organic acid and an alkali metal salt of said organic acid, for example acetic acid-sodium or potassium acetate, citric acid-sodium or potassium citrate, or tartaric acid-sodium or potassium tartrate is used. While about 1–5% by weight of acid is preferred, the amount is not critical.

The reaction is preferably carried out at elevated temperatures, such as from about 40° C. to 140° C. for a reaction period of from about 30 minutes to 72 hours in a suitable organic solvent in which the reactants are substantially soluble and with which no chemical reaction occurs. Usually a polar organic solvent is used such as the preferred lower alkyl alcohols having 1 to 4 carbon atoms, for example methanol, ethanol or isopropanol or mixtures thereof. Alternatively, however, an aromatic hydrocarbon having 6 to 8 carbon atoms such as benzene, toluene or xylene; a chlorinated hydrocarbon having 1 to 2 carbon atoms such as chloroform or carbon tetrachloride or an ether having 4 to 8 carbon atoms such as isopropyl ether, tetrahydrofuran or dioxane is used.

The 3-tertiary alkyl-pyrazolo[3,4-a]inden-4(1H)-one starting materials are prepared by reacting 2-acyl-1,3-indandiones with a molar equivalent amount of hydrazine by the following procedure:

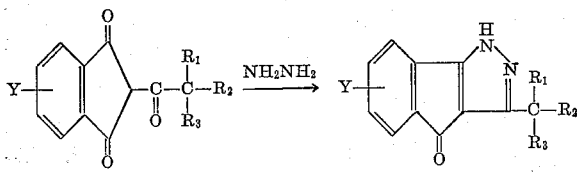

when Y, $R_1$, $R_2$ and $R_3$ are as previously defined.

The use of excess hydrazine in the above reaction is not detrimental in the preparation of the 3-tertiary alkyl-pyrazolo[3,4-a]inden-4(1H)-ones. By contrast 3-primary or secondary alkyl-pyrazolo[3,4-a]inden-4(1H)-ones are difficult to prepare when an excess of hydrazine is present as the reaction proceeds to give the corresponding hydrazone.

The reaction is preferably carried out at elevated temperatures such as from about 40° C. to 130° C. for a reaction period of from about 30 minutes to 24 hours. Usually a polar organic solvent, preferably methanol, ethanol or isopropanol is used. Alternatively, an aromatic hydrocarbon having 6 to 8 carbon atoms such as benzene, toluene or xylene; a chlorinated hydrocarbon having 1 to 2 carbon atoms such as chloroform or carbon tetrachloride or an ether having 4 to 8 carbon atoms such as isopropyl ether, tetrahydrofuran or dioxane is used.

The 2-acyl-1,3-indandiones which serve as starting materials for the above described process are either known to the art or are prepared by synthetic methods similar to those known, for instance by condensing a methyl ketone with a dimethyl or diethyl phthalate with an alkaline condensing agent such as sodium methoxide, sodium ethoxide or sodium hydroxide. The reaction can be carried out in an aromatic hydrocarbon solvent such as benzene, toluene or xylene.

The compounds in which $R_5$ is lower alkyl or acyl are preferably prepared by reacting the 3-tertiary alkyl-pyrazolo[3,4-a]inden-4(1H)-one intermediate with a basic reagent, preferably an alkali metal or its hydroxide, amide, carbonate or, advantageously, hydride, to form the N-metal salt, for instance the preferred sodium, potassium or lithium derivative at the 1-position. This N-metal derivative at the 1-position. This N-metal derivative is then reacted with a reactive alkyl or acyl halide to give the 1 - substituted - 3 - tertiary alkyl - pyrazolo[3,4 - a]inden-4(1H)-one compound.

The hydrazone products in which $R_4$ and $R_5$ are hydrogen are prepared, advantageously, by reacting a 2-acyl-1,3-indandione with at least two molar equivalents of hydrazine in the presence of acid without isolating the intermediate pyrazoloindenone. The reaction conditions employed are similar to those described above for the preparation of the 3-tertiary alkyl-pyrazolo[3,4-a]inden-4(1H)-one, hydrazones from the corresponding pyrazoloindenones.

When 2-acyl-1,3-indandione compounds substituted in the benzene ring are cyclized as described above, varying amounts of the two possible pyrazoloindenone isomers are obtained. These isomers are separated by fractional crystallization of the hydrazones from a suitable solvent such as a lower alcohol, for example aqueous ethanol.

Also there is some possibility that the 1-substituents may be on the 2-position in certain cases. The compounds which are prepared by the process of this invention have been named in the most logical manner known at this time and all isomers are included in this invention.

The following examples are not limiting but are illustrative of the method in accordance with this invention.

Example 1

A mixture of 4.6 g. of 2-pivaloyl-1,3-indandione and 0.65 g. of hydrazine in 40 ml. of ethanol is heated at reflux for two hours, then diluted with 400 ml. of water. A white solid is isolated by filtration and recrystallized from aqueous methanol to give 3-t-butylpyrazolo[3,4-a]-inden-4(1H)-one, M.P. 197–199° C.

A mixture of 3.5 g. of 3-t-butylpyrazolo[3,4-a]-inden-4(1H)-one and 1 ml. of 95% hydrazine in 25 ml. of ethanol is treated with 1 ml. of acetic acid and 0.3 g. of sodium acetate. The resulting mixture is refluxed for 72 hours. Dilution with water, filtration and recrystallization of the solid from aqueous ethanol gives 3-t-butyl-pyrazolo[3,4-a]inden-4(1H)-one, hydrazone, M.P. 232–235° C.

Example 2

Sodium methoxide (21.6 g.) is added to a mixture of 92 g. of dimethyl 4-chlorophthalate and 40 g. of pinacolone. The resulting mixture is heated on the steam bath for 18 hours, then concentrated in vacuo. The residue is dissolved in water and acidified with hydrochloric acid. The solid which separates is recrystallized from ethanol to give 5-chloro-2-pivaloyl-1,3-indandione, M.P. 100–104° C.

A suspension of 26.5 g. of 5-chloro-2-pivaloyl-1,3-indandione in 250 ml. of ethanol is treated with 15 ml. of hydrazine, 4 ml. of acetic acid and 0.5 g. of sodium acetate. The resulting mixture is refluxed for 72 hours. Concentrating and cooling to separate a solid and fractional crystallization from ethanol gives 3-t-butyl-6-chloropyrazolo[3,4-a]inden-4(1H)-one, hydrazone and 3-t-butyl-7-chloropyrazolo[3,4-a]inden-4(1H)-one, hydrazone.

Example 3

A mixture of 97.0 g. of dimethyl phthalate and 71.0 g. of 3,3-diethyl-2-pentanone is treated with 28.5 g. of sodium methoxide. After adding 300 ml. of toluene the mixture is heated on a steam bath for ten hours. Concentrating in vacuo, dissolving the residue in water, acidifying the aqueous solution with concentrated hydrochloric acid and extracting with ether gives, upon evaporation of the ether extracts 2-(2,2-diethylbutyryl)-1,3-indandione.

Hydrazine hydrate (10.0 g.) and 2-(2,2-diethylbutyryl)-1,3-indandione (54.0 g.) are refluxed for three hours in 400 ml. of ethanol. Cooling, diluting with water, filtering and recrystallizing the solid from aqueous methanol gives 3-(1,1-diethylpropyl)-pyrazolo[3,4-a]inden-4(1H)-one.

A mixture of 26.8 g. of 3-(1,1-diethylpropyl)-pyrazolo-[3,4-a]inden-4(1H)-one, 5.0 g. of hydrazine, 5 ml. of acetic acid and 250 ml. of ethanol is refluxed for 64 hours. Dilution with water separates 3-(1,1-diethylpropyl)-pyrazolo[3,4-a]inden-4(1H)-one, hydrazone which is purified by recrystallization from aqueous ethanol.

Example 4

Treatment of 19.4 g. of dimethyl phthalate and 12.8 g. of 3-ethyl-3-methyl-2-pentanone with 5.4 g. of sodium methoxide as in Example 2 gives 2-(2-ethyl-2-methyl butyryl)-1,3-indandione.

A mixture of 12.9 g. of 2-(2-ethyl-2-methyl-butyryl)-1,3-indandione, 1.6 g. of hydrazine and 100 ml. of methanol is heated at reflux for four hours. After dilution with water, the mixture is filtered and the white solid obtained is recrystallized from aqueous methanol to give 3-(1-ethyl-1-methylpropyl) - pyrazolo[3,4 - a] - inden-4(1H)-one.

A mixture of 12.7 g. of this ketone, 4.0 g. of hydrazine, 0.5 ml. of hydrochloric acid and 100 ml. of ethanol is refluxed for 48 hours. Adding water, filtering and recrystallizing the solid from aqueous ethanol gives 3-(1-ethyl-1-methylpropyl) - pyrazolo[3,4 - a]inden - 4(1H)-one, hydrazone.

Example 5

To a mixture of 100 ml. of concentrated sulfuric acid and 600 ml. of water is added 61.5 g. of 2-amino-4-trifluoromethylbenzoic acid. The mixture is cooled to 0° C. and treated with 21.0 g. of sodium nitrite in 50 ml. of water. After standing at 5–10° C. for one hour and filtering, the diazonium solution is added slowly with stirring to a solution of cuprous cyanide, prepared by mixing a warm solution of 160 g. of copper sulfate in 400 ml. of water with 85 g. of potassium cyanide in 100 ml. of water. Sodium carbonate is also added portionwise to keep the solution from becoming acidic. The resulting mixture is heated at 50–60° C. for one hour. Cooling, filtering the precipitate and recrystallizing from aqueous ethanol gives 2-cyano-4-trifluoromethylbenzoic acid.

A mixture of 45 g. of the above prepared cyano compound and 100 ml. of 55% sulfuric acid is heated at 165° C. for 30 minutes. Cooling, pouring into ice and extracting with ether gives 4-trifluoromethylphthalic acid. This acid is refluxed with 500 ml. of methanol and ½ part of concentrated sulfuric acid for two hours. The mixture is concentrated and extracted with ether. The ether extracts are washed with sodium carbonate solution and with water, dried, concentrated and distilled to give dimethyl 4-trifluoromethylphthalate.

A mixture of 26.2 g. of dimethyl 4-trifluoromethylphthalate and 10.0 g. of pinacolone is treated with 5.7 g. of sodium methoxide and heated on a steam bath for 16 hours. Working up as in Example 2 gives 2-pivaloyl-5-trifluoromethyl-1,3-indandione.

The above prepared indandione (15.0 g.), 2.7 g. of hydrazine hydrate and 100 ml. of ethanol is heated at reflux for two hours. Cooling and diluting with water separates a mixture of 3-t-butyl-6-(and 7)-trifluoromethyl pyrazolo[3,4-a]inden-4(1H)-one.

These ketones (2.9 g.) are refluxed with 0.5 g. of hydrazine, 2.0 ml. of acetic acid and 0.5 g. of sodium acetate in 50 ml. of hydrazine for 72 hours. Adding water, filtering and fractionally crystallizing the solid gives 3-t-butyl-6-trifluoromethylpyrazolo[3,4-a]inden-4-(1H)-one, hydrazone and 3-t-butyl-7-trifluoromethylpyrazolo[3,4-a]inden-4(1H)-one, hydrazone.

*Example 6*

Reaction of dimethyl 4-nitrophthalate with pinacolone in the presence of sodium methoxide as in Example 2 yields 5-nitro-2-pivaloyl-1,3-indandione.

A mixture of 27.5 g. of 5-nitro-2-pivaloyl-1,3-indandione, 7.0 g. of hydrazine and 125 ml. of benzene is treated with 3.0 g. of tartaric acid and 1.0 g. of sodium tartrate. The resulting mixture is refluxed for 72 hours. Concentrating and cooling separates a mixture of 3-t-butyl-6(and 7)-nitropyrazolo[3,4-a]inden-4(1H)-one, hydrazone which are separated by fractional crystallization from ethanol.

*Example 7*

Dimethyl 3-methylphthalate (20.8 g.), 3,3-dimethyl-2-pentanone (11.4 g.) and sodium methoxide (5.7 g.) are heated on a steam bath for 18 hours. Concentrating, dissolving the residue in water, acidifying and isolating the solid by filtration gives 4-methyl-2-(2,2-dimethylbutyryl)-1,3-indandione.

A mixture of 12.9 g. of the above prepared indandione, 2.5 g. of hydrazine hydrate and 75 ml. of ethanol is refluxed for two hours, then diluted with water to yield, as a precipitate, a mixture of isomers, 3-(1,1-dimethylpropyl)-5(and 8)-methylpyrazolo[3,4-a]inden-4(1H)-one.

These ketones (2.5 g.), hydrazine (0.4 g.), acetic acid (1.0 ml.) and isopropyl ether (75 ml.) are heated at reflux for 48 hours. Diluting with water, filtering and fractionally crystallizing gives 3-(1,1-dimethylpropyl)-5-methylpyrazolo[3,4-a]inden-4(1H)-one, hydrazone and the corresponding 8-methyl isomer.

*Example 8*

Dimethyl 4-aminophthalate is reacted with pinacolone and sodium methoxide to give 5-amino-2-t-butyl-1,3-indandione.

A mixture of 2.4 g. of this dione, 7.0 g. of hydrazine, 1.2 g. of citric acid and 50 ml. of chloroform is heated at reflux for 72 hours. Concentration and cooling gives a mixture of 6(and 7)-amino-3-t-butylpyrazolo[3,4-a]inden-4(1H)-one, hydrazone which are separated by fractional crystallization from ethanol.

*Example 9*

A mixture of dimethyl 4-diethylaminophthalate (24.5 g.), pinacolone (10.0 g.) and sodium methoxide (5.7 g.) is heated on a steam bath for 12 hours. Concentrating, adding water, acidifying and filtering gives 5-diethylamino-2-pivaloyl-1,3-indandione.

A mixture of 2.8 g. of this indandione, 1.0 g. of hydrazine, 1 ml. of acetic acid and 0.3 g. of sodium acetate in 25 ml. of ethanol is refluxed for 72 hours. Concentrating and cooling gives a mixture of isomers which are separated by fractional crystallization from ethanol to yield 3-t-butyl-6-diethylaminopyrazolo[3,4-a]inden-4(1H)-one, hydrazone and 3-t-butyl-7-diethylaminopyrazolo-[3,4-a]inden-4(1H)-one, hydrazone.

*Example 10*

A mixture of 2.7 g. of 5-dimethylamino-2-pivaloyl-1,3-indandione (prepared by reacting dimethyl 4-dimethylaminophthalate, pinacolone and sodium methoxide as in Example 9), 1.0 g. of hydrazine, 1.5 ml. of citric acid and 0.5 g. of sodium citrate in 50 ml. of ethanol is refluxed for 48 hours. Working up as in Example 9 gives 3-t-butyl-6-dimethylaminopyrazolo[3,4-a]inden-4(1H)-one, hydrazone and 3-t-butyl-7-dimethylaminopyrazolo-[3,4-a]inden-4(1H)-one, hydrazone.

*Example 11*

Dimethyl 3-acetamidophthalate (25.1 g.), pinacolone (10.0 g.) and sodium methoxide (5.7 g.) are heated on a steam bath for 12 hours to give 4-acetamido-2-pivaloyl-1,3-indandione.

Hydrazine hydrate (0.5 g.) and 4-acetamido-2-pivaloyl-1,3-indandione (2.8 g.) are refluxed for two hours in 50 ml. of ethanol. Cooling and diluting with water gives as a mixture of isomers, 5(and 8)-acetamido-3-t-butylpyrazolo[3,4-a]inden-4(1H)-one.

Refluxing this ketone with hydrazine and acetic acid in ethanol gives a mixture of 5(and 8)-acetamido-3-t-butylpyrazolo[3,4-a]inden-4(1H)-one, hydrazone which are separated by fractional crystallization from ethanol.

*Example 12*

A mixture of 2.2 g. of 3-t-butylpyrazolo[3,4-a]inden-4(1H)-one (made as in Example 1), 0.5 g. of methylhydrazine, 0.5 ml. of acetic acid and 0.3 g. of sodium acetate in 50 ml. of ethanol is heated at reflux for 24 hours to give, upon concentration and cooling, 3-t-butylpyrazolo[3,4-a]inden-4(1H)-one, methylhydrazone.

*Example 13*

Five grams of 3-t-butylpyrazolo[3,4-a]inden-4(1H)-one (prepared as in Example 1) is heated with 100 ml. of 5% potassium hydroxide. The resulting potassium salt is refluxed with 10 ml. of methyl iodide in 50 ml. of ethanol for four hours. Filtration and then evaporation of the volatiles leaves, as the residue, 3-t-butyl-1-methylpyrazolo-[3,4-a]inden-4(1H)-one. This ketone is heated with 0.7 g. of hyrazine and 1 ml. of acetic acid in 50 ml. of ethanol for 48 hours to give, after dilution with water, filtration and recrystallization from ethanol, 3-t-butyl-1-methylpyrazolo[3,4-a]inden-4(1H)-one, hydrazone.

*Example 14*

A mixture of 5.0 g. of 3-t-butylpyrazolo[3,4-a]inden-4(1H)-one (prepared as in Example 1) and 100 ml. of 10% aqueous sodium hydroxide is warmed for five minutes. The sodium salt, isolated by concentrating and filtering the reaction mixture, is refluxed with 10 ml. of acetyl chloride in benzene solution to give, after filtration and evaporation of the volatile material, 1-acetyl-3-t-butylpyrazolo[3,4-a]inden-4(1H)-one.

Refluxing the above prepared indenone (2.6 g.) with 0.5 g. of hydrazine, 1 ml. of acetic acid, 0.5 g. of sodium acetate and 25 ml. of ethanol for 36 hours, diluting with water and filtering gives 1-acetyl-3-t-butylpyrazolo-[3,4-a]inden-4(1H)-one, hydrazone.

*Example 15*

Ethylhydrazine (0.6 g.), 3-t-butylpyrazolo[3,4-a]inden-4(1H)-one (2.2 g.), acetic acid (1 ml.) and 75 ml. of toluene is refluxed for 16 hours. Concentrating, cooling and filtering gives 3-t-butylpyrazolo[3,4-a]inden-4-(1H)-one, ethylhydrazone.

*Example 16*

A mixture of 2.9 g. of 3-t-butyl-6(and 7)-trifluoromethylpyrazolo[3,4-a]inden-4(1H)-one (prepared as in Example 5), 0.74 g. of acetic acid hydrazine, 0.5 ml. of acetic acid, 0.2 g. of sodium acetate and 30 ml. of ethanol is heated at reflux for 48 hours. Adding water, filtering and fractionally crystallizing the solid material from ethanol gives 3-t-butyl-6-trifluoromethylpyrazolo[3,4-a]-inden-4(1H)-one, acetylhydrazone and the corresponding 7-trifluoromethyl compound.

*Example 17*

A mixture of 2.5 g. of a mixture of 3-(1,1-dimethylpropyl)-5(and 8)-methylpyrazolo[3,4-a]inden-4(1H)-one (prepared as in Example 7) and 75 ml. of 10% aqueous sodium hydroxide is warmed very briefly, then concentrated. The sodium salt is isolated by filtration. Two grams of this salt and 5.0 g. of ethyl bromide in 25 ml. of ethanol are refluxed for four hours. The sodium bromide is filtered and the volatiles are removed to leave 1-ethyl-3-(1,1-dimethylpropyl)-5-(and 8)-methylpyrazolo-[3,4-a]inden-4(1H)-one.

A mixture of the above prepared ketone, 0.4 g. of hydrazine, 1.2 ml. of acetic acid, and 0.5 g. of sodium acetate in 40 ml. of dioxane is refluxed for 48 hours. Diluting with water, filtering and fractionally crystallizing from ethanol gives 1-ethyl-3-(1,1-dimethylpropyl)-5-methylpyrazolo[3,4-a]inden-4(1H)-one, hydrazone and the corresponding 8-methyl isomer.

*Example 18*

Dimethyl 4-aminophthalate (2.0 g) and methyl iodide (1.6 g.) are refluxed in 30 ml. of dimethylformamide for four hours. Water is added and the organic material is extracted with benzene and washed with 1% hydrochloric acid. Evaporation of the benzene layer leaves dimethyl 4-methylaminophthalate.

What is claimed is:

1. The method of preparing a 3-tertiary alkylpyrazolo-[3,4-a]inden-4(1H)-one, hydrazone having the following fundamental formula:

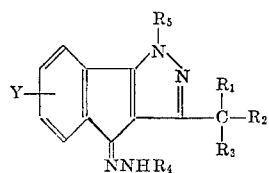

in which Y is a member selected from the group consisting of hydrogen, chloro, trifluoromethyl, methoxy, nitro, methyl, amino, mono-lower alkylamino, di-lower alkylamino and acetamido; $R_1$, $R_2$ and $R_3$ are members selected from the group consisting of methyl and ethyl; and $R_4$ and $R_5$ are members selected from the group consisting of hydrogen, lower alkanoyl and lower alkyl which comprises reacting a 3-tertiary alkyl-pyrazolo[3,4-a]inden-4(1H)-one having the following formula:

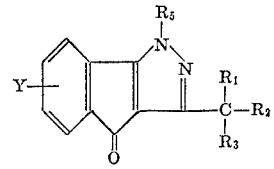

in which Y, $R_1$, $R_2$, $R_3$ and $R_5$ are as previously defined, with at least one molar equivalent of a hydrazine having the following formula: $H_2NNHR_4$, in which $R_4$ is as previously defined, in the presence of about 1–5% of an acid selected from the group consisting of hydrochloric, sulfuric, acetic, citric, maleic, fumaric, lactic and tartaric acids at from about 40–140° C. for about 30 minutes to 72 hours in an organic solvent selected from the group consisting of a lower alkyl alcohol having 1 to 4 carbon atoms, an aromatic hydrocarbon having 6 to 8 carbon atoms, a chlorinated hydrocarbon having 1 to 2 carbon atoms and an ether having 4 to 8 carbon atoms.

2. The method of claim 1 in which the acid is an acid buffer solution comprising a member selected from the group consisting of acetic acid-sodium acetate, citric acid-sodium citrate and tartaric acid-sodium tartrate.

No references cited.